Figure 1:
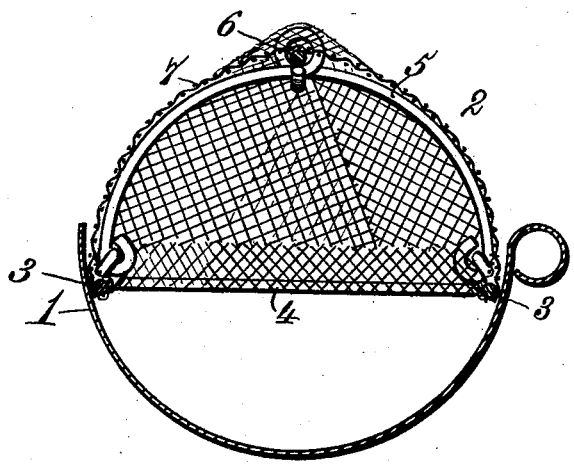
Figure 2:
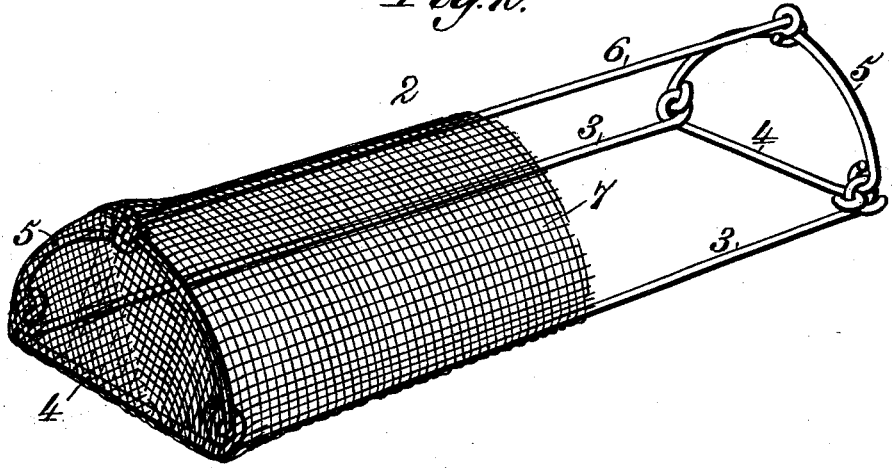

No. 643,747. Patented Feb. 20, 1900.
J. L. MARTIN.
SIEVE ATTACHMENT FOR EAVES TROUGHS.
(Application filed June 19, 1899.)

(No Model.)

Witnesses.
Robert Orrett,
H. B. Keefer

Inventor:
John L. Martin,
By James L. Norris
Atty.

UNITED STATES PATENT OFFICE.

JOHN L. MARTIN, OF GLASS, TENNESSEE.

SIEVE ATTACHMENT FOR EAVES-TROUGHS.

SPECIFICATION forming part of Letters Patent No. 643,747, dated February 20, 1900.

Application filed June 19, 1899. Serial No. 721,117. (No model.)

*To all whom it may concern:*

Be it known that I, JOHN L. MARTIN, a citizen of the United States, residing at Glass, in the county of Obion and State of Tennessee, have invented new and useful Improvements in Sieve Attachments for Eaves-Troughs, of which the following is a specification.

My invention consists of a sieve attachment for eaves troughs or gutters, one object of the same being to prevent the nesting of birds in the eaves-trough and the passage of leaves and dirt from the roof into the trough and consequent clogging of the trough and the befouling of the water conveyed into the cistern therefrom.

A further object of the invention is to provide means not only for preventing the leaves, trash, and other dirt from the roof passing into the trough itself, but to prevent the lodgment of the same upon the screen or sieve.

Other objects and advantages of the invention will hereinafter appear and the novel features thereof will be set forth in the claims.

The eaves trough or gutter 1 may be of any suitable form or construction.

My sieve attachment 2 is adapted to be applied to the trough 1 without the use of fastening devices, and consists of a frame covered with an arch-shaped strip of wire-netting, perforated sheet metal, or other open-work material. Said frame is made of wire, comprising parallel longitudinally-extending side bars 3 3, parallel transversely-extending bars 4 4 at the ends of the bars 3, arch-shaped upwardly-extending rods or bars 5 5 at the ends of the rods 3 and 4, and a longitudinally-extending ridge-bar 6, connecting the central portions of the arched bars 5 5 and lying above but parallel with the bars 3 3. The connections between the respective bars are made by eyes in one and hooks in the other engaging said eyes. The frame above described is covered, as stated, by a sheet or strip 7 of open-work material.

My attachment is applied to the eaves trough or gutter 1, as shown in the drawing—that is, with the convex portion of the screen-covering 7 and the ridge-bar 6 uppermost. The same is held in place by the frictional engagement of the side bars 3 3 with the inner surface of the trough or gutter, and by providing the convex upper side of the sieve attachment the leaves and other trash from the roof are prevented from lodging or resting upon the screen or sieve itself. The water from the roof has free access thereto, but all foreign matter is prevented from passing into the trough by means of the sieve. Clogging of the trough is therefore prevented and all foreign matter is kept from the cistern in which the trough discharges.

Having now described my invention, what I claim as new, and desire to secure by Letters Patent, is—

1. An eaves-trough sieve attachment, consisting of a frame constructed with longitudinal side bars, connections between the ends of the side bars and arch-shaped bars at the ends of said side bars, and open-work material secured to the longitudinal side bars and supported in arched form by said arch-shaped end bars, substantially as described.

2. An eaves-trough sieve attachment, consisting of a frame constructed with longitudinal side bars, end bars connecting the latter, arch-shaped bars engaged with the ends of the side bars and a ridge-bar connecting the top portions of the arch-shaped bars, and screen material secured to the side bars and extending in arch form over and supported by the arch-shaped end bars and said ridge-bar, substantially as described.

3. The combination with an eaves-trough, of a sieve attachment therefor, consisting of a frame covered with open-work material adapted to be applied to and frictionally retained in place in said trough, said frame being constructed of wire comprising parallel longitudinally-extending side bars, transversely-extending end bars connecting said side bars, upwardly-extending arch-shaped end bars, and a ridge-bar parallel to said side bars and connecting the uppermost portions of said arch-shaped bars.

In testimony whereof I have hereunto set my hand in presence of two subscribing witnesses.

JOHN L. MARTIN.

Witnesses:
 W. J. NICHOLS,
 ENLOE CHILES.